United States Patent
Terranova (10) Patent No.: US 8,420,143 B2
(45) Date of Patent: Apr. 16, 2013

(54) ORGANIC PRODUCE WASH SYSTEM

(75) Inventor: Anthony Joseph Terranova, Laguna Hills, CA (US)

(73) Assignee: Anterra Group, Inc., Laguna Hills, CA (US)

( * ) Notice: Subject to any disclaimer, the term of this patent is extended or adjusted under 35 U.S.C. 154(b) by 1146 days.

(21) Appl. No.: 12/197,878

(22) Filed: Aug. 25, 2008

(65) Prior Publication Data

US 2010/0047414 A1    Feb. 25, 2010

(51) Int. Cl.
*A23L 3/00* (2006.01)
*A23L 3/34* (2006.01)
*A23L 3/3409* (2006.01)

(52) U.S. Cl.
USPC ............................ 426/335; 426/331; 426/333

(58) Field of Classification Search ................. 426/335, 426/333, 331; 99/516; 134/25.3
See application file for complete search history.

(56) References Cited

U.S. PATENT DOCUMENTS

| | | | |
|---|---|---|---|
| 4,463,023 A | 7/1984 | McCorkle et al. | |
| 5,487,835 A | 1/1996 | Shane | |
| 5,514,264 A | 5/1996 | Shane | |
| 5,928,573 A * | 7/1999 | Spencer et al. | 261/122.1 |
| 2005/0233039 A1 * | 10/2005 | Wolfe et al. | 426/324 |
| 2006/0110310 A1 | 5/2006 | Shane | |

OTHER PUBLICATIONS

Praxair, Inc., marketing brochure entitled: Wastewater Treatment with Carbon Dioxide, 2 pgs (copyright date of 1998).*

Brown et al. Chemistry The Central Science, 1981, Prentice-Hall, Inc., 2nd Edition. pp. 456-458.*

Praxair, Inc., "Carbon Dioxide Water Treatment Systems," marketing brochure available at: http://www.praxair.com/praxair.nsf/0/B4C610C00B567F1D852574360075ADCF/$file/P8153.pdf, 4 pgs (copyright date of 1997).

Suslow, Trevor, "Postharvest Chlorination," University of California, Publication 8003, Division of Agriculture and Natural Resources, available at: http://ucanr.org/freepubs/docs/8003.pdf, 8 pgs (copyright date of 1997).

Praxair, Inc., marketing brochure entitled: "Wastewater Treatment with Carbon Dioxide," 2 pgs (copyright date of 1998).

Advanced Sensor Technologies, Inc. marketing brochure entitled "Carbon Dioxide for pH Control" available at: http://www.astisensor.com/Carbon_Dioxide_Versus_Mineral_Acids.pdf#search="carbon dioxide for pH Control", 3 pgs, Document properties state the document was created on Apr. 9, 2000.

Suslow, Trevor, "Postharvest Handling for Organic Crops," University of California, Publication 7254, Division of Agriculture and Natural Resources, available at: http://anrcatalog.ucdavis.edu/pdf/7254.pdf, 8 pgs (copyright date of 2000).

(Continued)

*Primary Examiner* — D. Lawrence Tarazano
*Assistant Examiner* — Stephanie Cox
(74) *Attorney, Agent, or Firm* — Nathan P. Letts; Stephen M. Lobbin; The Eclipse Group LLP (57) ABSTRACT

The present application describes a produce wash system for dispersing carbon dioxide into a liquid medium which includes a container containing carbon dioxide gas which is connected to another container or pipe capable of containing a liquid medium so that the gas from the first container is capable of being dispersed into the liquid medium of the second container or pipe.

24 Claims, 3 Drawing Sheets

OTHER PUBLICATIONS

Teefy, Susan, et al., "Optimizing the Use of $CO_2$ for Bromate Control," presentation to the American Water Works Association Annual Conference, presentation available at: http://www.wqts.com/prez/04_CarbonDioxide_files/frame.htm, 30 pgs (Jun. 2003).

Rosenberger, David A. et al., "Maintaining Biocide Levels in Water Flumes in Packing Houses," 2004 Cornell Fruit Handling and Storage Newsletter, pp. 23-26, available at: http://www.hort.cornell.edu/watkins/Newsletter2004.pdf, 26 pgs (2004).

* cited by examiner

FIG. 3

ORGANIC PRODUCE WASH SYSTEM

BACKGROUND OF THE INVENTION

1. Field of the Invention

The present invention relates to the field of produce washing and sanitization, including washing and sanitization for organic fruits and vegetables. The present invention relates more specifically to a carbon dioxide gas dispersing system for use in washing and sanitizing post-harvest organic fruits and vegetables.

2. General Background and State of the Art

The use of flumes containing an aqueous medium is a frequent choice for handling post-harvest produce such as fruits and vegetables. In addition to providing transportation to different processing locations, it also allows for debris removal while cushioning the produce against bruising. In a conventional post-harvest wash procedure, the aqueous medium typically contains organic compounds in order to provide some level of disinfection and sanitation of the fruits and vegetables. Such chemicals, however, are expensive and many times not very effective.

There is a need in the field of post-harvest produce washes, particularly those for organic fruits and vegetables, for an improved system and method for providing sanitized fruits and vegetables.

SUMMARY OF THE INVENTION

In one aspect, the invention is directed to a carbon dioxide dispersing system. In one aspect, the $CO_2$ gas dispersed or "sparged" into the liquid medium wash system creates acidified fluids, which may be used to wash post-harvest produce. The inventive $CO_2$ gas dispersion system also may be used to optimize free and total chlorine residuals in a fluid medium containing chlorine in order to provide a sanitizing fruit and vegetable wash system.

In one aspect of the invention, food safe or food grade surfactant may be included in the wash. Suitable surfactants may include without limitation, dodecylbenzene sulfonic acid, sodium lauryl sulfate, sodium laurel ethyl sulfate, polysorbate 20, polysorbate 80, or sodium alkynaphthalenesulfonate, or a combination thereof.

The wash system may include, without limitation, pre-wash systems, dip tanks, make up storage systems, chillers, hydro coolers, processing flumes and spray bars used for product rinse as well as conveyer belt wash. In addition, the carbon dioxide sparging system may be suitable for once-through and/or re-circulated systems.

The sparging system may be controlled manually or by using a variety of sensors to automatically determine the desired amount and force of the gas to be sparged. Such sensors may include without limitation a water meter, pH control or oxidation reduction potential (ORP). In one aspect, the inventive system is suitable for water systems operating in a range of 33° F. (0.5° C.) to 211° F. (99.4° C.).

In one aspect, the invention is directed to a system for dispersing carbon dioxide into a liquid medium comprising: a first container containing carbon dioxide gas, which is connected to a second container or pipe capable of containing a liquid medium so that the gas from the first container is capable of being dispersed into the second container or pipe. The second container or pipe may include a water meter, a pH monitor, or an oxidation reduction potential (OPR), or a combination thereof, which is/are operably connected to the first container.

The first and second containers may be connected through a sparger from the first container. The system may include a liquid medium. The liquid medium may or may not include additionally added chlorine at the site of wash. The liquid medium may also include food grade surfactant. Further, fruits and/or vegetables may be included in the second container.

In another embodiment, the invention is directed to a method for cleaning fruits and/or vegetables comprising contacting the fruits and/or vegetables that need to be cleaned with a liquid medium, which has been mixed with carbon dioxide so as to provide a sanitizing liquid medium. The fruits and/or vegetables may be post-harvest. Chlorine may or may not be added to the liquid medium. In the case where chlorine is added, the chlorine content of the liquid medium may be about 1 ppm to 200 ppm, less than about 10 ppm or less than about 5 ppm. The liquid medium may be sparged with carbon dioxide before contacting the fruits and/or vegetables with the liquid and/or during contact with the fruits and/or vegetables.

In one aspect, the liquid medium may be sparged with carbon dioxide so as to maintain a pH of about 6.5 to 7, in particular where the liquid medium includes chlorine.

The liquid medium may be part of a pre-wash system, make-up storage system, chiller system, hydro cooler system, processing flume, spray bar or a conveyor wash system. And the carbon dioxide may be dispersed into the liquid medium in a re-circulation loop. Further, the carbon dioxide may be dispersed into the liquid medium through a sparger located within the container for the liquid medium.

The present invention is also directed to a method for sparging produce wash water comprising the steps of: (1) providing wash water; (2) sparging wash water with $CO_2$ so as to maintain pH of wash water between about 6.5 and 7. Chlorine may be added to the wash water in amounts discussed in the present application, or chlorine may not be added to the wash water at all. Food-grade surfactants also may be added to the wash water. The wash water may be part of a pre-wash system, make-up storage system, chiller system, hydro cooler system, processing flume, spray bar or conveyor wash system. And the produce may be post-harvest.

These and other objects of the invention will be more fully understood from the following description of the invention, the referenced drawings attached hereto and the claims appended hereto.

BRIEF DESCRIPTION OF THE DRAWINGS

The present invention will become more fully understood from the detailed description given herein below, and the accompanying drawings which are given by way of illustration only, and thus are not limitative of the present invention, and wherein.

DETAILED DESCRIPTION OF THE PREFERRED EMBODIMENTS

In the present application, "a" and "an" are used to refer to both single and a plurality of objects.

As used herein, the term "chlorine" may have several meanings, but typically it refers to the amount of free chlorine or available chlorine that is present in a solution. The more precise term, "available chlorine," is defined as the amount of chlorine, in any form, available for oxidative reaction and disinfection. Herein, the terms "chlorine," "free chlorine" and "available chlorine" are used interchangeably.

As used herein, "post-harvest" refers to harvested fruits and/or vegetables from the field, which require removal of debris and washing.

Available Chlorine Sources

Common disinfectants containing chlorine are NaOCl (sodium hypochlorite or household bleach) and $Ca(OCl)_2$ (calcium hypochlorite). When added to water, both form the same active germicidal ingredient, HOCl (hypochlorous acid). The following equations describe the result of their addition to water. It is important to note that in addition to other ions, both form HOCl (hypochlorous acid).

$$NaOCl_{(l)} + H_2O_{(l)} \rightarrow Na^+_{(l)} + OH^-_{(l)} + HOCl_{(l)}$$

$$Ca(OCl)_{2(l)} + 2H_2O_{(l)} \rightarrow Ca^{2+}_{(l)} + 2OH^-_{(l)} + 2HOCl_{(l)}$$

Chlorine Efficacy

The disinfecting property of chlorine is dependent on the amount of HOCl (hypochlorous acid) present. When HOCl comes into contact with organic materials containing unpaired electrons, such as those in aromatic double bonds, amine-N and mercaptans, the chlorine reacts with these electrons. In particular, the ability to oxidize the mercaptan group (—SH) allows it to effectively disrupt the cell wall of gram positive bacteria and the outer membrane of gram negative bacteria. It can also oxidize the mercaptan group of enzymes in the cytoplasmic membrane of bacteria, and oxidize mercaptan groups of enzymes and proteins within the cytoplasm of the bacterial cell. It is this action, as an oxidizing agent, that yields its germicidal activity.

Sanitizer Defined by the CFR

As used herein, a "sanitizer" is an agent that is used to adequately treat food-contact surfaces by a procedure that is effective in destroying vegetative cells of microorganisms of public health significance, and in substantially reducing numbers of other undesirable microorganisms, but without adversely affecting the product or its safety for the consumer.

When sodium hypochlorite is used as a sanitizer, the USDA requires the active chlorine concentration in solution be no less than 50 ppm and no greater than 200 ppm (USDA, 1981). The general industry standard recommends 100 to 150 ppm for fruits and vegetables. In contrast, the National Organic Standards Board has proposed that certified organic vegetables be washed with chlorine solutions that do not exceed the residual disinfectant limit allowable (4 ppm) under the Safe Drinking Water Act. It is important to continuously monitor the available chlorine level because organic matter will "use up" chlorine, thereby reducing the solution's sanitizing ability.

Therefore, the present invention is directed to a sanitizing liquid medium for a post-harvest wash that contains about 1 to 200 ppm chlorine, preferably about 1 to 175, 1 to 150, 1 to 125, 1 to 100, 1 to 75, 1 to 50, 1 to 25, 1 to 10, 1 to 5, 1 to 4, 1 to 3, 1 to 2, 2 to 175, 2 to 150, 2 to 125, 2 to 100, 2 to 75, 2 to 50, 2 to 25, 2 to 10, 2 to 5, 2 to 4, 2 to 3, 3 to 175, 3 to 150, 3 to 125, 3 to 100, 3 to 75, 3 to 50, 3 to 25, 2 to 10, 3 to 5, or 3 to 4 ppm. The chlorine content may also be less than about 5 ppm, less than about 4 ppm, less than 3 ppm, or less than 2 ppm.

Maintaining the Efficacy of a Solution

The efficacy of a chlorine solution is affected by several factors. Although higher concentrations of chlorine-producing reactants will increase the amount of HOCl and its effectiveness in killing microorganisms, the USDA limits the permissible available chlorine level. Increasing the temperature will also increase chlorine's antimicrobial activity, however higher temperatures may adversely affect the produce and increase the release of noxious gases.

The most important factor, therefore, in maintaining the chlorine efficacy is pH control, because it is the pH that determines the amount of HOCl available.

Figure 1:
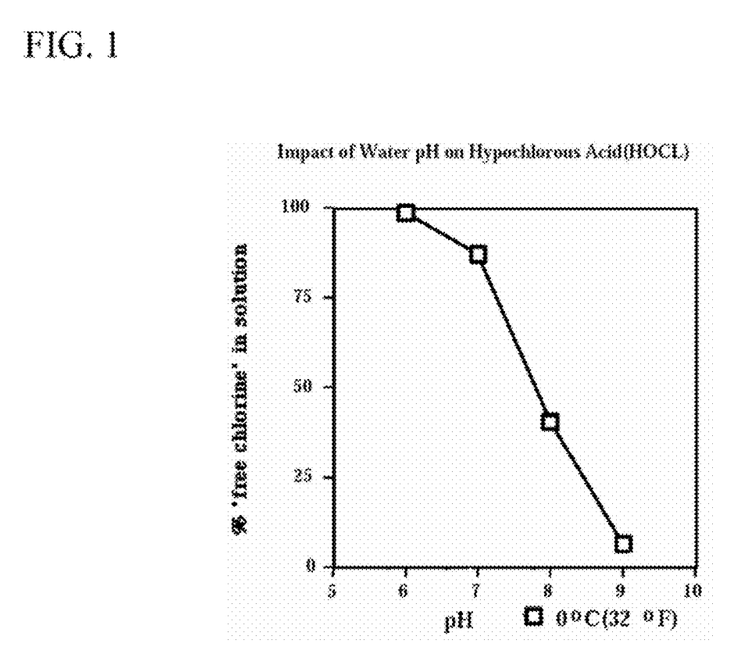
FIG. 1 shows a graph of the impact of water pH on hypochlorous acid (HOCl).

As shown in FIG. 1, HOCl concentration varies with the pH, but it is optimal at pHs between about 6.5 and 7.0. As the following equation reveals:

$$OH^-_{(l)} + HOCl_{(l)} \leftrightarrow H_2O_{(l)} + OCl^-_{(l)}$$

As the pH goes higher, increasing numbers of hydroxide ions ($OH^-$) are added to the left side of the equation, which shifts the equilibrium to the right. This results in a reduction in the amount of HOCl available, while increasing the amount hypochlorite ion ($OCl^-$), a less effective bactericidal agent.

At a pH<6.5, the solution becomes more acidic and corrosive to metals. (If the pH should fall below 4.0, deadly chlorine gas will be formed.) It is therefore obvious that pH control plays a key role in the chlorine sanitization process and must be carefully monitored and regulated.

Carbon Dioxide Gas and Carbonic Acid

Carbon dioxide, $CO_{2\,(g)}$, is one of the gases present in our atmosphere to the extent of about 380-385 ppm. Because the triple point of carbon dioxide is approximately 75 psi at −49.2° F., liquid carbon dioxide forms only at pressures above 75 psi. In its pure form under normal atmospheric pressure, the gas is odorless, slightly toxic and produces a slightly pungent taste. It is the byproduct of many industrial processes, for example, including the combustion of all fossil fuels, fermentation, and metabolic respiration.

When $CO_{2\,(g)}$ comes into contact with water, it first simply dissolves.

$$CO_{2\,(g)} \rightarrow CO_{2\,(aq)}$$

At room temperatures, the solubility of $CO_{2\,(g)}$ is approximately 90 cm³ per 100 mL of solution. Of that, only about 1% of the carbon dioxide exists as carbonic acid. An equilibrium is reached between the dissolved $CO_2$ (aq), liquid water ($H_2O_{(l)}$), and carbonic acid ($H_2CO_{3\,(aq)}$).

$$CO_{2\,(aq)} + H_2O_{(l)} \rightarrow H_2CO_{3\,(aq)}$$

Carbonic acid ($H_2CO_{3\,(aq)}$) is a diprotic acid, meaning that at varying pH values it can dissociate releasing up to two hydrogen ions ($H^+_{(aq)}$).

The equation for the first dissociation is:

$$H_2CO_{3\,(aq)} \rightarrow H^+_{(aq)} + HCO_3^-_{(aq)} \quad K_a = 4.2 \times 10^{-7}$$
$$(pH \cong 6.38)$$

This dissociation releases the hydrogen ion ($H^+_{(aq)}$) and one bicarbonate ion ($HCO_3^-_{(aq)}$). At a lower pH, the bicarbonate ion, in turn, can dissociate according to the following equation, releasing a second hydrogen ion and a carbonate ion ($CO_3^{2-}_{(aq)}$):

$$HCO_3^-_{(aq)} \rightarrow H^+_{(aq)} + CO_3^{2-}_{(aq)} \quad K_a = 4.8 \times 10^{-11}$$
$$(pH \cong 5.16)$$

Figure 2:
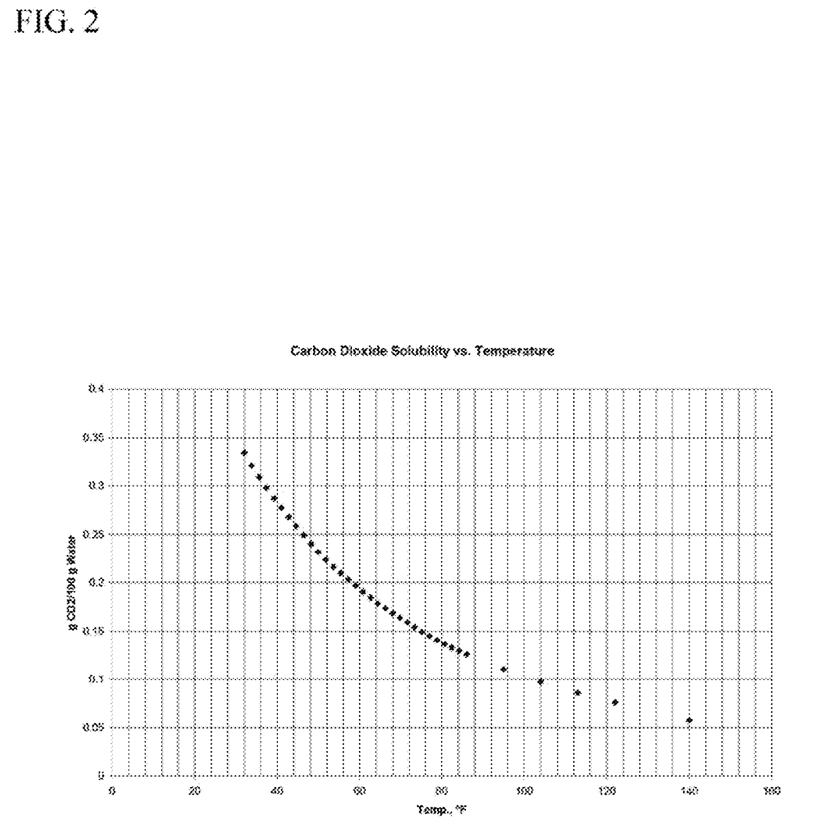
FIG. 2 shows a graph of the solubility of carbon dioxide in fluid in relation to temperature.

In this application, the process water is approximately 34° F. (1.11° C.). As shown in FIG. 2, carbon dioxide becomes increasingly soluble in cold water (0.3212 g/100 mL of water at 33.8° F.).

Both the solubility of carbon dioxide and equilibrium of the carbonic acid dissociations are affected by the water's temperature. Since it is the pH (ratio $H^+_{(aq)}/OH^-_{(aq)}$) that regulates the amount of $HOCl_{(aq)}$ in the equilibrium mixture, the flume water pH should be maintained between about 6.5 and 7.0 to enhance the effectiveness of the chlorine sanitization process.

pH Control Using Carbon Dioxide

The EPA, through its Green Chemistry program, has encouraged, whenever possible, the use of "safer" chemicals and the reduction of hazardous wastes. In the past, numerous suggestions have been offered for ways to reduce the amount of unwanted carbon dioxide ($CO_2$) entering our atmosphere. The present application provides a method that meets the above objectives. First, it replaces the use of an organic acid with a safer weak acid to control the pH of the flume water. Second, it provides a use for the burgeoning amounts of carbon dioxide gas which might otherwise be released to the atmosphere or sequestered.

As an added bonus, just as it does in our blood, the equilibrium formed by the carbonate/bicarbonate ion pair ($CO_3^{2-}$/$HCO_3^-$) provides for very strong buffering of the solution at approximately $pH \cong 6$. This buffering capacity results in a solution with a nearly stable pH that is in the range where HOCl is at its maximum value and therefore has the maximum sanitizing capacity.

Dispersion of Gases

The dispersion of gases in liquids is a process that is used in the chemical, petrochemical, and pharmaceutical industries for fermentation and oxidation reactions, synthesis, and the manufacture of fine chemicals, for example. If the gas flow rate is high, the behavior of the gas-liquid mixture differs considerably from that of the liquid alone. The power requirements are different as well. For optimal gas-liquid mixing, this device should deliver a uniform flow of gas through the liquid medium.

$CO_2$ Dispersion System for Post-Harvest Produce Wash without Citric Acid or Chlorine The inventive post-harvest wash system includes dispersing a controlled amount of $CO_2$ gas into the wash system, either directly into the reservoir of the wash fluid, or into a pipe containing the wash water in transit. Dispersion of $CO_2$ into the wash fluid acidifies the fluid releasing carbonic acid, which has biocidal or biostatic effects upon contact with microorganisms. Therefore, the inventive system includes a sanitizing post-harvest wash system using the inventive $CO_2$ dispersion system. Moreover, in one comparison test, when citric acid is replaced with $CO_2$ in a standard post-harvest produce wash solution, the $CO_2$-sparged wash fluid resulted in unexpectedly less microbial load on the washed produce than the solution containing citric acid as the organic acid buffer. Therefore, applicant has discovered for the first time the advantageous post-harvest produce washing properties of $CO_2$-sparged wash fluid.

It is also understood that the $CO_2$ system may be used in the absence of added chlorine, other than that which is contained in publicly available faucet water. The $CO_2$ system may be used to acidify wash water in either the presence or absence of added chlorine.

Food-Grade Surfactants

The $CO_2$ dispersion system may be used in conjunction with various food grade surfactants in order to provide further sanitized produce. Any surfactant may be used which has been indicated in the art to be food grade or is not harmful to humans. Such surfactants may include without limitation, dodecylbenzene sulfonic acid, sodium lauryl sulfate, sodium laurel ethyl sulfate, polysorbate 20, polysorbate 80, and sodium alkynaphthalenesulfonate.

$CO_2$ System Description

A. Pre-Wash Systems

Pre-wash systems are a preliminary cleaning step in the processing of fruits and vegetables used to remove soils prior to entering the processing stage. These systems can be hoses, spray bars, dip tanks or flumes, and can be once-through or re-circulated in style. Water temperature can range from ambient to chilled (33° F., 0.5° C.) or hot (211° F., 99.4° C.), depending on product and final processing requirements.

A-1. Hose Type and Spray Bar Systems

The inventive carbon dioxide dispersion system when used in hose type and spray bar pre-wash systems can be configured several ways: as a make-up storage system, as a once-through system or as a re-circulated system feeding hoses or spray bars used to rinse soils from the fruits or vegetables.

A-2. Dip Tank Systems

The inventive carbon dioxide dispersion system when used in dip tank pre-wash systems is preferably a once-through system. The system can be configured as a make-up storage system or a once-through system. In dip tank applications, a non re-circulated tank is filled with water and the fruits or vegetables are immersed to rinse soils. The water is dumped or the produce is lifted from the tank in a secondary vessel or on a conveyor permitting the water to drain.

A-3. Flume Pre-Wash Systems

The inventive carbon dioxide dispersion system when used in flume pre-wash systems can be configured several ways: as a make-up storage system, as a once-through system or as a re-circulated system. Water is circulated through the flume and the produce to be washed is introduced into one end. The flow of water moves the produce to the other end of the flume where it is removed from the flume. In a re-circulated system, the water is collected and circulated back to the flume for reuse. In a once-through system, the water is discharged after contact with the produce to be washed.

B. Make Up Storage Systems

Make up storage systems store water for use in pre-wash systems, dip tanks, chillers, flumes and spray bars used in processing fruits and vegetables. Make up storage system water temperature can range from ambient to chilled (33° F., 0.5° C.) or hot (211° F., 99.4° C.), depending on product and final processing requirements. Make up water systems can be configured as a single storage vessel or as multiple tanks. Tanks can be open to atmosphere or enclosed. Make up storage systems can be once-through or re-circulated in design.

B-1. Re-Circulated Systems

The inventive carbon dioxide dispersion system when used in re-circulated make-up systems can be applied to the make-up supply prior to entry into the storage vessel or in the storage vessel, the supply line to the process, or the return line from process.

B-2. Once-Through Systems

The inventive carbon dioxide dispersion system when used in once-through make-up systems can be applied to the make-up supply prior to entry into the storage vessel, in the storage vessel, or in the supply line to the process. In a once-through system, the water is discharged after contact with the fruit or vegetable to be washed.

C. Chiller Systems

Chiller systems cool water for use in fruit and vegetable processing. They can be re-circulated or once-through in design. Chiller systems are normally paired with pre-wash systems, dip tanks, make-up storage systems, hydro coolers, processing flumes and/or spray bar systems.

C-1. Re-Circulated Systems

The inventive carbon dioxide dispersion system when used in re-circulated chiller systems can be applied to the make-up supply prior to entry into the chiller, the chiller, the supply line(s) to the process, or the return line(s) from process.

C-2. Once-Through Systems

The inventive carbon dioxide dispersion system when used in once-through chiller systems can be applied to the make-up supply prior to entry into the chiller, the chiller, or the supply line to the process. In a once-through system, the water is discharged after contact with the fruit or vegetable to be washed or cooled.

D. Hydro Cooler Systems

Hydro cooler systems are used to cool fruits or vegetables before or after processing and packaging. Hydro cooler systems can be re-circulated or once-through, cascading wash, immersion vessel, or vacuum tube in design. Hydro coolers are paired with chiller systems in the cascading wash or immersion vessel configuration. Vacuum tube systems cool the re-circulated water by applying a vacuum to the pressure vessel.

D-1. Re-Circulated Cascading or Immersion Vessel Systems

The inventive carbon dioxide dispersion system when used in re-circulated chiller supplied, cascading or immersion systems can be applied to the make-up supply prior to entry into the chiller, in the chiller, in the supply line(s) to the hydro cooler, or in the return line(s) from hydro cooler.

D-2. Once-Through Systems

The inventive carbon dioxide dispersion system when used in once-through chiller supplied, cascading or immersion systems can be applied to the make-up supply prior to entry into the chiller, in the chiller, or in the supply line to the hydro cooler. In a once-through system, the water is discharged after contact with the fruit or vegetable to be cooled.

D-3. Vacuum Systems

The inventive carbon dioxide dispersion system when used in vacuum tube hydro cooler systems can be applied to the make-up water or the re-circulation portion of the water system. In one aspect, the inventive carbon dioxide dispersion system should not be applied to the vacuum portion of the system for optimum results.

E. Processing Flumes

Processing flumes are used to wash fruits and vegetables. Processing flumes can be single or multiple stage in design. Processing flumes are an intermediate step in the processing of fruits and vegetables. These systems can be once-through or re-circulated in style. Water temperature can range from ambient to chilled (33° F., 0.5° C.) or hot (211° F., 99.4° C.), depending on product and final processing requirements. Processing flumes can incorporate turbulent zones as aids to the cleaning process.

E-1. Flume Systems

The inventive carbon dioxide dispersion system when used in flume systems can be configured several ways: as a make-up storage system, as a once-through system or as a re-circulated system. Water is circulated through the flume and the fruit or vegetable to be washed is introduced into one end. The flow of water moves the fruit or vegetable to the other end of the flume where the fruit or vegetable is removed from the flume. In a re-circulated system, the water is collected and circulated back to the flume for reuse. In a once-through system, the water is discharged after contact with the fruit or vegetable to be washed.

F. Spray Bar and Conveyor Wash Systems

Spray bar systems are used as a final product rinse and as a conveyor belt rinse to remove soils in processing fruits and vegetables. These systems can be once-through or re-circulated in style. Water temperature can range from ambient to chilled (33° F., 0.5° C.) or hot (211° F., 99.4° C.), depending on product and final processing requirements.

F-1. Spray Bar Systems

The inventive carbon dioxide dispersion system when used in flume systems can be configured in at least two ways: as a make-up storage system or as a once-through system. In the makeup storage system the water is held in a storage tank and released to the system. The spray bars may be arranged to provide complete spray coverage of the fruit or vegetable to be washed as they are transported past the spray bars. Spray bars may be a single unit or multiple bars placed in series. Most final rinses are a once-through configuration. In the once-through system water is treated as it moves past an injection point and immediately goes to the use point in the system.

F-2. Conveyor Wash Systems

The inventive carbon dioxide dispersion system when used in conveyor wash systems can be configured in several ways: as a make-up storage system, as a once-through system or as a re-circulated system. In the makeup storage system, the water is held in a storage tank and released to the system. The spray bars are arranged to provide complete spray coverage of the conveyor belt to be washed. Spray bars may be a single unit or multiple bars placed in series. In the once-through configuration, water is treated as it moves past an injection point and immediately goes to the use point in the system to be discharged. In the re-circulated system, the spray is collected and returned to the system for reuse.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims. The following examples are offered by way of illustration of the present invention, and not by way of limitation.

EXAMPLES

Example 1

Application Configurations

In general, the inventive carbon dioxide dispersion system should be configured to apply the carbon dioxide to the smallest amount of water to keep the ratio of $CO_2$:water as high as possible. This may not be possible in tanks that do not have a re-circulation loop, or in other large vessels used in the treatment of fruits and vegetables. The use of a sparger at the injection point is a significant feature of the invention for the overall efficacy of the carbon dioxide dispersion program. Although the system can be operated manually, an automatic valve located in the $CO_2$ line at the tank, injection point or at an intermediate point is preferred. Many applications will be a variation of one or more of the following: fed from a makeup storage tank, applied to the piping system (including hoses), or fed directly into the flume.

Example 2

Tank Systems

The inventive carbon dioxide dispersion system when used in tank systems should be configured into a re-circulation loop (pipe system) if possible. In the absence of a re-circulating loop, spargers have been placed in the tank. In-tank spargers should be located at least 6" off the floor of the tank and may be configured as a single sparger running horizontally across the tank, as multiple spargers emanating from a central hub running horizontally across the tank, as multiple spargers emanating from a central hub running horizontally across the tank on several levels, as a central vertically mounted sparger, or as a series of vertical spargers throughout the tank. Tank systems include makeup systems and once-through systems.

Example 3

Pipe Systems

The inventive carbon dioxide dispersion system when used in pipe systems should be configured with a sparger running coaxially or tangentially to the flow.

Example 4

Flume Systems

The inventive carbon dioxide dispersion system when used in flume systems (direct feed) should be configured with a sparger located as close to the water inlet as possible. It is recommended that flume systems be configured to feed as a pipe system, as this will give the highest efficacy of the carbon dioxide dispersion program.

Example 5

Control Systems

The inventive carbon dioxide dispersion system can be controlled manually or assisted by the use of environmental sensors or monitors, such as, without limitation, water meter, pH control, or oxidation reduction potential (ORP).

Example 6

Water Meter Systems

The inventive carbon dioxide dispersion system when used with a water meter is configured to allow introduction of the $CO_2$ in proportion to the volume of water passing through the water meter. An on-off signal can be used or a proportional 4-20 mA signal (preferred) can be used to open a valve on the $CO_2$ line at the storage tank or point of injection.

Example 7 pH and ORP Monitors

The inventive carbon dioxide dispersion system when used with pH or ORP monitors is operated by a signal generated by a pH or ORP probe inserted into the system downstream of the injection point. An on-off signal may be used or preferably a proportional 4-20 mA signal is used to open a valve on the $CO_2$ line at the storage tank or the point of injection.

Example 8

Manual Systems

Manual systems are operated by checking the pH or ORP value of the water with a meter (mounted in situ or as a stand alone, hand held meter). The valve controlling the $CO_2$ in opened or closed manually in response to the reading obtained and the value desired in the system.

Example 9

Sparger Sizing

Sparger sizing is important to the efficacy of the inventive carbon dioxide dispersion system. The following calculation should be used to select the appropriate sparger(s): Sparger sizing is based on the superficial gas exit velocity from the porous sparger surface, expressed in feet per minute (FPM), calculated from actual cubic feet per minute per square foot of sparger surface area (ACFM/Ft.2). ACFM is calculated at the liquid pressure and temperature at the sparger, and it is not based on gas pressure.

Example 10

Sizing Procedure for In-Tank Spargers

1. Determine gas flow required in standard cubic feet per minute (SCFM).
2. Determine liquid pressure at the sparger, in PSIG (P).
2.1 For open or vented tanks, liquid head in feet×0.433× specific gravity PSIG. (Specific Gravity of water=1.0).
2.2 For closed tanks or vessels with a pressurized head space, add head space pressure to the liquid head pressure to obtain (P).
3. Determine liquid temperature ° F., (T).
4. Determine ACFM, from SCFM using standard gas formula.

$$ACFM = SCFM \times 14.7 \times (460+T);\ or$$

$$ACFM = SCFM \times (14.7+P)\ 520$$

5. Select Gas Exit Velocity, FPM. See Gas Exit Velocity Chart.
6. Calculate sparger area required Ft2 (A).

$$A = ACFM/FPM$$

7. Select appropriate Mott sparger element or elements, and determine best in-tank arrangement based on process requirements. In agitated tanks, use reinforced elements or provide support as required.
Gas Exit Velocity Chart In-Tank, Not Agitated:
5-10 FPM Design
25 FPM Maximum
In-Tank, Agitated:

| If | Then |
| --- | --- |
| 1-5 FPS* | 25 FPM Design |
|  | 50 FPM Maximum |
| 5-10 FPS* | 25 FPM Design |
|  | 100 FPM Maximum |
| >10 FPS* | 50 FPM Design |
|  | 150 FPM Maximum |

*Calculate agitator tip speed:
$$\frac{Agitator\ Diameter\ (in) \times RPM}{229} = FPS$$

Lower exit velocities will produce smaller bubbles. Exit velocities may be less than the design values given. In some instances, actual application must be tested/proven. Reinforced or supported elements should be used in agitated vessels.

Example 11

Intrusive Pipe Line Sparger Sizing

Intrusive pipe line sparger sizing, where the sparger element is located inside of the pipe line, is based on the superficial Gas Exit Velocity from the sparger element in relation to the liquid velocity in the annulus between the inside of the pipe line and the sparger element. Exit velocity is expressed in feet per minute (FPM), calculated from actual cubic feet per minute per square foot of sparger surface area (ACFM/Ft2). ACFM is calculated at the liquid pressure and temperature in the pipe line (not gas pressure).

Example 12

Intrusive Pipe Line Sparger Sizing Procedure

1. Determine gas flow required in standard cubic feet per minute (SCFM).
2. Determine liquid pressure in the pipe line in PSIG (P).
3. Determine liquid temperature ° F., (T).
4. Determine ACFM using standard gas formula $$ACFM = SCFM \times 14.7 \times (460+T); \text{ or}$$

$$ACFM = SCFM \times (14.7+P) 520$$

5. Determine liquid flow in gallons per minute (GPM).
6. Determine pipe line size.
7. Assume a sparger diameter.
8. Calculate liquid linear velocity in the annulus between the pipe line ID and the sparger element ID.
9. Select Gas Exit Velocity FPM.
10. Calculate sparger area required Ft2 (A).

$$A = ACFM/FPM$$

11. Select the appropriate sparger element. A reinforced element, or an element with a centering spider for support within the pipe line, is recommended for pipe line spargers.

| Gas Exit Velocity Chart | |
|---|---|
| If | Then |
| 1-5 FPS** | 25 FPM design |
| | 50 FPM maximum |
| 5-10 FPS** | 25 FPM design |
| | 100 FPM maximum |
| >10 FPS** | 50 FPM design |
| | 150 FPM maximum |

| Element Diameter Guide | | |
|---|---|---|
| Pipe Size | Sparger ⌀ | Flow @ 10 FPS* |
| ½" | ⅜" | 6 GPM |
| ¾" | ½" | 10.5 GPM |
| 1" | ¾" | 13.1 GPM |
| 1½" | 1" | 39 GPM |
| 2" | 1" | 80 GPM |
| 3" | 1½" | 175 GPM |
| 4" | 2" | 299 GPM |
| 6" | 2½" | 747 GPM |
| >6" | 2½" | Calculate** |

*Based on schedule 40 pipe.
**Liquid linear velocity in annulus between the pipe and sparger element FPS.
FPS = GPM/[(pipe ID)2 − (sparger OD)2] × 2.448

Lower gas exit velocities produce finer bubbles. Exit velocities can be <5 FPM with good performance. In some instances, actual application must be tested/proven. Reinforced elements are recommended, or elements with a centering spider for support within the pipe line.

Example 13

Evaluation of Microbial Load on Produce Using $CO_2$ Acidified Wash Water

Microbial loads as measured by aerobic plate count (APC) and total coliform counts (TCC) on produce were highly variable and there does not appear to be significant difference in APC levels among unwashed produce varieties. However, certain types of produce may contain higher total coliform levels. Effectiveness of the wash system in reducing microbial load appeared to be dependent on produce variety.

Typically, a list of the easiest to clean produce to the most difficult may be as follows: chopped romaine>herbs>spring mix>spinach; chopped romaine being the easiest to clean, and spinach being the most difficult.

Table 1 shows the difference in microbial load of the pre-wash and post-wash produce using Enviromental Baseline File (EBF) solution, which contains citric acid as a buffer.

TABLE 1

Evaluation of the current EBF produce wash system containing citric acid buffer in reducing indicator organisms.

| | | APC (Log cfu/g) | TCC (Log MPN/g) |
|---|---|---|---|
| Spinach | Pre-wash | 5.79 | 2.97 |
| | Post-wash | 5.71 | 2.36 |
| | Log reduction | 0.08 | 0.61 |
| Romaine | Pre-wash | 5.61 | 3.97 |
| | Post-wash | 3.80 | 1.63 |
| | Log reduction | 1.81 | 2.34 |
| Spring Mix | Pre-wash | 5.77 | 4.38 |
| | Post-wash | 5.33 | 3.15 |
| | Log reduction | 0.44 | 1.23 |
| Herbs | Pre-wash | 5.98 | 3.63 |
| | Post-wash | 4.13 | 2.63 |
| | Log reduction | 1.86 | 1.00 |

In contrast, when citric acid was replaced with $CO_2$ sparge as an acidifier, the wash solution was at least as effective as the wash containing citric acid on the reduction of APC and TCC, with higher efficacy among specific produce varieties, such as chopped romaine and spinach. $CO_2$ as a wash line acidifier presents an effective and less costly alternative to citric acid. The results are shown in Table 2.

TABLE 2

Evaluation of the EBF produce wash system in microbial load when citric acid was replaced with $CO_2$ as the acidifier.

| | | APC (log cfu/g) | | TCC (log MPN/g) | |
|---|---|---|---|---|---|
| | | $CO_2$ | Control | $CO_2$ | Control |
| Spinach | Pre-wash | 5.51 | 5.94 | 3.23 | 2.98 |
| | Post-wash | 4.33 | 5.49 | 2.42 | 2.05 |
| | Log reduction | 1.18 | 0.45 | 0.81 | 0.93 |
| Romaine | Pre-wash | 5.05 | 5.93 | 0.96 | 2.86 |
| | Post-wash | 2.70 | 4.91 | 0.48 | 1.23 |
| | Log reduction | 2.35 | 1.02 | 0.48 | 1.63 |
| Spring Mix | Pre-wash | 3.71 | 4.62 | 2.47 | 3.05 |
| | Post-wash | 3.32 | 4.27 | 1.48 | 2.58 |
| | Log reduction | 0.39 | 0.35 | 0.99 | 0.47 |

Without being bound by any theory on the reason for the effectiveness, the difference is likely due to surface properties such as hydrophobicity which makes the surface "wettable". A more "wettable" surface would allow for better contact with sanitizer/wash solution especially within crevices where microorganisms often reside. A less "wettable" surface would likely exclude the solution from these crevices, leading to lower wash efficacy.

In order to further assess the microbial load, shelf life samples stored at three different conditions are evaluated for organoleptic and microbial qualities: 36-38° F. for 16 days, 36-38° F. for the first seven days and at 45° F. for remaining 9 days, and 45° F. for 16 days.

Example 14

$CO_2$ Dispersion Wash System

Figure 3:
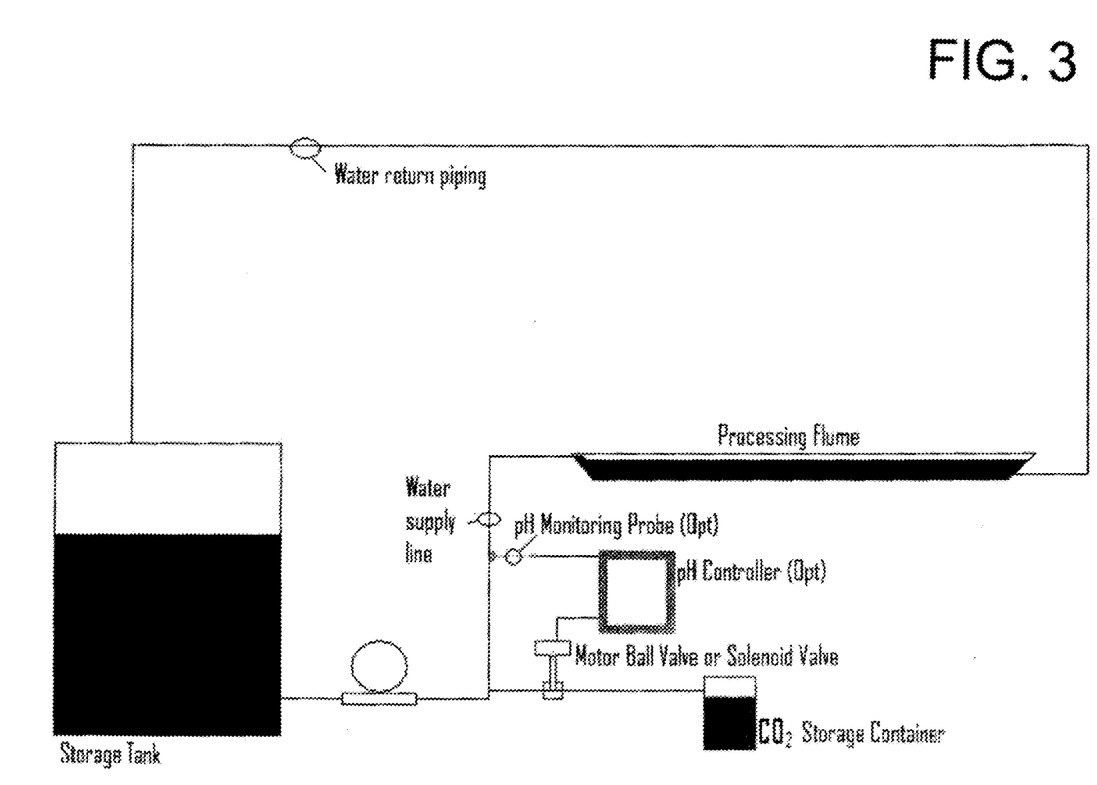
FIG. 3 shows an example of the $CO_2$ dispersion wash system.

FIG. 3 shows an example of a $CO_2$ dispersion wash system. A flume system is exemplified. Referring to FIG. 3, wash water is gathered in a storage tank. Water is passed from the tank via a water supply line to the processing flume, where the produce is washed. The supply line is fitted with probes and spargers. The line may be sparged with a controlled amount of $CO_2$. Optionally, a pH monitor of the fluid may be installed to control the amount of $CO_2$ dispersed into the water line. The fluid travels through the flume and is recycled into the storage tank.

All of the references cited herein are incorporated by reference in their entirety.

\* \* \*

Those skilled in the art will recognize, or be able to ascertain using no more than routine experimentation, many equivalents to the specific embodiments of the invention specifically described herein. Such equivalents are intended to be encompassed in the scope of the claims.

What is claimed is:

1. A method for cleaning and sanitizing post-harvest produce comprising providing a liquid medium including wash water containing produce, sparging a controlled amount of a gas consisting of carbon dioxide under pressure into the liquid medium in the direction of the wash water flow in a manner wherein the pH of the wash water is maintained between about 6 and 7.5, and contacting the produce that needs to be cleaned with the liquid medium mixed with the carbon dioxide gas so as to provide a cleaning and sanitizing liquid medium.

2. The method according to claim 1, wherein no chlorine has been added to the liquid medium.

3. The method according to claim 1, wherein chlorine has been added to the liquid medium as a chemical microbiocide prior to sparging with carbon dioxide.

4. The method according to claim 3, wherein the chlorine content of the liquid medium is about 1 ppm to 200 ppm.

5. The method according to claim 4, wherein the chlorine content of the liquid medium is about 1 ppm to about 10 ppm.

6. The method according to claim 1, wherein the liquid medium is sparged with carbon dioxide before contacting the produce.

7. The method according to claim 1, wherein the liquid medium is sparged with carbon dioxide before and during contact with the produce.

8. The method according to claim 1, wherein the liquid medium is sparged with carbon dioxide so as to maintain pH of at least 6.5 and not more than 7.

9. The method according to claim 1, wherein the liquid medium is part of a pre-wash system, make-up storage system, chiller system, hydro cooler system, processing flume, spray bar or conveyor wash system.

10. The method according to claim 1, wherein the carbon dioxide is dispersed into the liquid medium in a re-circulation loop.

11. The method according to claim 1, wherein the carbon dioxide is dispersed into the liquid medium through a sparger located within the container for the liquid medium.

12. The method according to claim 1, wherein the produce is organic.

13. A method for sparging produce wash water comprising the steps of: (1) providing wash water; (2) sparging wash water with $CO_2$ at a rate of less than 5 feet per minute.

14. The method according to claim 13, wherein no chlorine has been added to the wash water.

15. The method according to claim 13, wherein chlorine has been added to the wash water.

16. The method according to claim 13, wherein the wash water is part of a pre-wash system, make-up storage system, chiller system, hydro cooler system, processing flume, spray bar or conveyor wash system.

17. The method according to claim 13, wherein the produce is organic.

18. A method for cleaning and sanitizing post-harvest produce comprising providing a liquid medium including wash water containing produce, sparging a controlled amount of a gas consisting of carbon dioxide under pressure into the liquid medium in the direction of the wash water flow in a manner wherein the pH of the wash water is maintained between about 6 and 7.5 by the delivery of the controlled amount of carbon dioxide gas, and contacting the produce that needs to be cleaned with the liquid medium mixed with the carbon dioxide gas so as to provide a cleaning and sanitizing liquid medium.

19. The method according to claim 18, wherein no chlorine has been added to the liquid medium.

20. The method according to claim 18, wherein chlorine has been added to the liquid medium as a chemical microbiocide prior to sparging with carbon dioxide.

21. The method according to claim 20, wherein the chlorine content of the liquid medium is about 1 ppm to 200 ppm.

22. The method according to claim 18, wherein the liquid medium is sparged with carbon dioxide before contacting the produce.

23. The method according to claim 18, wherein the liquid medium is sparged with carbon dioxide before and during contact with the produce.

24. The method according to claim 18, wherein the liquid medium is part of a pre-wash system, make-up storage system, chiller system, hydro cooler system, processing flume, spray bar or conveyor wash system.

\* \* \* \* \*